UNITED STATES PATENT OFFICE.

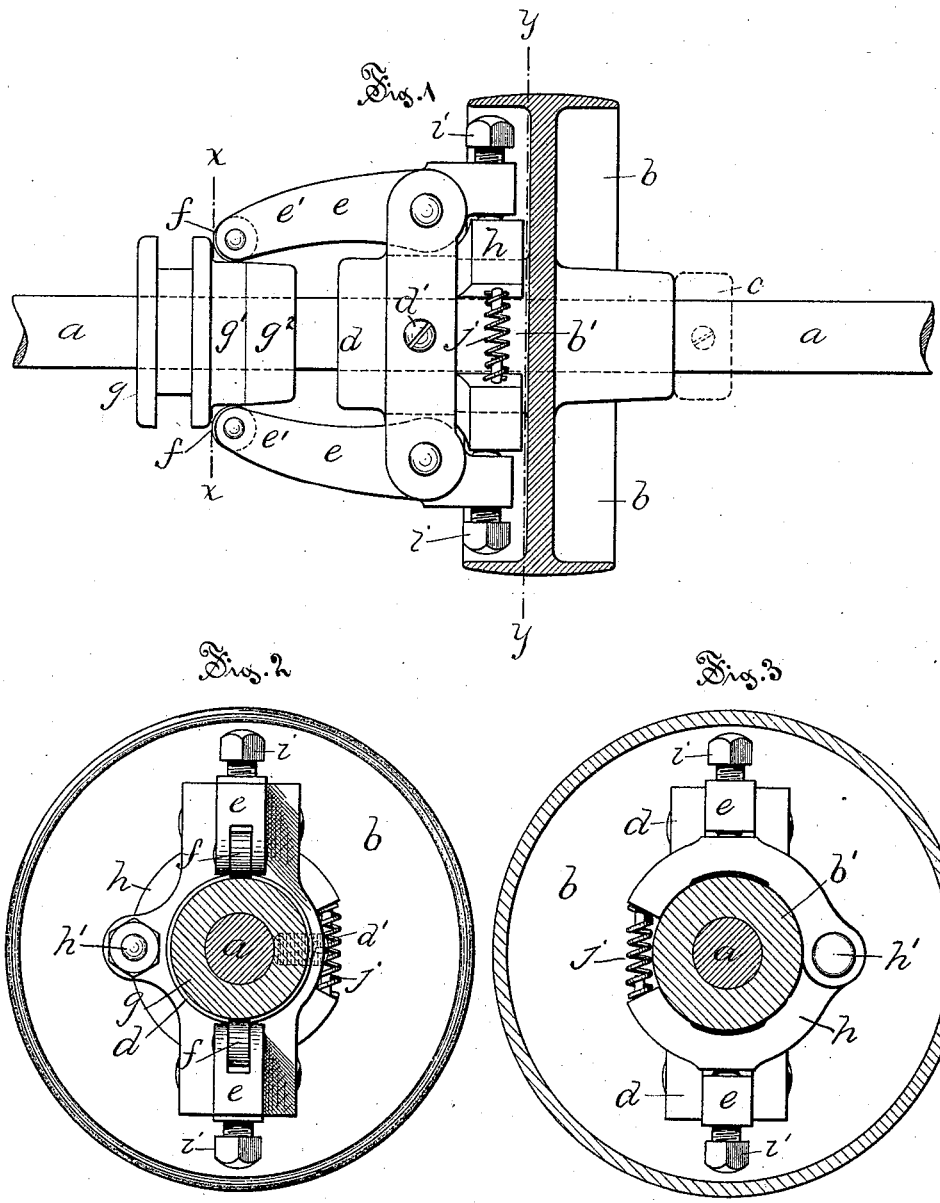

THOMAS H. THOMPSON, OF HARTFORD, CONNECTICUT, ASSIGNOR TO THE SIGOURNEY TOOL COMPANY, OF SAME PLACE.

FRICTION-CLUTCH.

SPECIFICATION forming part of Letters Patent No. 319,867, dated June 9, 1885.

Application filed April 23, 1885. (No model.)

*To all whom it may concern:*

Be it known that I, THOMAS H. THOMPSON, of Hartford, in the county of Hartford and State of Connecticut, have invented certain new and useful Improvements in Friction-Clutches, of which the following is a description, reference being had to the accompanying drawings, where—

Figure 1 is a plan view of a shaft bearing my improved clutch, the loose pulley being shown in central section. Fig. 2 is a view in cross-section of the shaft and sliding wedge on plane denoted by line $x\,x$ of Fig. 1 and showing the clutch in rear view. Fig. 3 is a view in cross-section of the pulley and shaft on plane denoted by line $y\,y$ of Fig. 1, and showing the clutch in front view.

My invention relates to the class of clutches that are operated by means of sliding wedges and levers that hold the respective parts that are temporarily connected by means of a frictional grasp; and it consists in the particular combination of the fixed collar bearing the sets of parallel and transverse levers, and the sliding wedge, and in the details of construction and combination of the several parts, by means of which a gain is made in strength and efficiency over the prior devices of this class.

In the accompanying drawings, the letter $a$ denotes the shaft; $b$, a loose pulley borne on the shaft and held against lateral movement by any desired and convenient device, as by means of a collar, $c$, indicated in Fig. 1 in dotted outline, the collar being fixed to the shaft by means of a set-screw or wedged thereto. The collar $d$ forms the lever-supporting part of my improved clutch, and it is secured to the shaft by means of a set-screw, $d'$, in proper position for the transverse levers or jaws of the clutch to grasp the hub $b'$ of the pulley $b$. The levers $e$ are pivoted to the collar $d$ upon opposite sides of the latter, and they have a limited swinging play in a plane common to the axis of the shaft. The longer arms $e'$ of the lever $e$ project backward and slightly inward along the shaft, and each bears an anti-friction roll, $f$, that moves upon the surface of the sliding wedge $g$, when the latter is pushed between the levers. This wedge has the usual groove to receive the forked end of a lever, by means of which it may be slid to and fro on the shaft, and it has also a cylindrical body part, $g'$, terminating in a tapered part, $g^2$, on the side next to the lever ends. A second series of levers or jaws, $h$, are so pivoted to the collar $d$ by a pivot, $h'$, common to both, that they swing in a plane across the axis of the shaft, and substantially at right angles to it, and with their inner faces overlying the outer surface of the hub $b'$ of the pulley. These inner faces of the jaws $h$ are cut away or relieved, preferably, for a certain distance about the center of their length, in order to enable them to grasp the hub $b'$ at points more regularly distributed around the latter, and also to cause them to more readily and quickly release their grasp on the hub when pressure on the jaws is relieved. The inner and shorter arms of the levers $e$ are provided with adjustable screw-pins $i$, that move in threaded sockets in the levers in position to bear on the backs of the jaws $h$, about in their centers, and by means of these pins the degree of pressure upon the jaws $h$, caused by thrusting the wedge $g$ between the longer arms of the levers, can be carefully adjusted by screwing the pins in or out, as the case requires.

In the space between the free ends of the jaws $h$ there is preferably seated a spring, $j$, so arranged as to thrust the jaws apart as soon as the inward pressure of the levers on the jaws is relieved and this frees the hub entirely from the contact of the jaws and holds the latter away from the hub until a clamping pressure is again applied. This spring $j$ is not indispensable to the releasing of the grasp of the jaws, but is a desirable aid thereto.

Although herein described and illustrated as applied to a shaft to engage a loose pulley, my device is also adapted to connect two lengths of shafting that lie in the same line and are continuous, and for other purposes within the ordinary use of the friction-clutch.

I claim as my improvement—

1. In a friction-clutch, in combination, a shaft, $a$, a collar, $d$, fast to the shaft and bearing the levers $e$, swinging in a plane parallel to the shaft, and also the spring-retracted transverse jaws $h$, having inturned grasping-faces, and the sliding wedge $g$, all substantially as described.

2. In a friction-clutch, in combination, a shaft, $a$, a collar, $d$, fast to the shaft and bearing the levers $e$, swinging in a plane parallel to the shaft, and also the transverse jaws $h$, having the inturned and relieved grasping-faces, a jaw-retracting spring, $j$, and the sliding wedge $g$, all substantially as described.

3. In a friction-clutch, in combination, a shaft, $a$, a collar, $d$, fast to the shaft and bearing the levers $e$, with anti-friction rolls $f$ and adjustable pins $i$, and also the transverse jaws $h$, having inturned grasping-faces, the spring $j$, whereby the jaws are forced apart, and the sliding wedge $g$, with cylindrical surface $g'$ and tapered surface $g^2$, all substantially as described.

4. In a friction-clutch, in combination, a shaft, $a$, a collar, $d$, fast to the shaft and having the levers $e$, with anti-friction rolls $f$ and adjustable screws $i$, and also transverse jaws $h$, the spring $j$, whereby the jaws are forced apart, and the sliding wedge $g$, all substantially as described.

THOMAS H. THOMPSON.

Witnesses:
CHAS. L. BURDETT,
H. R. WILLIAMS.